Figure 1:
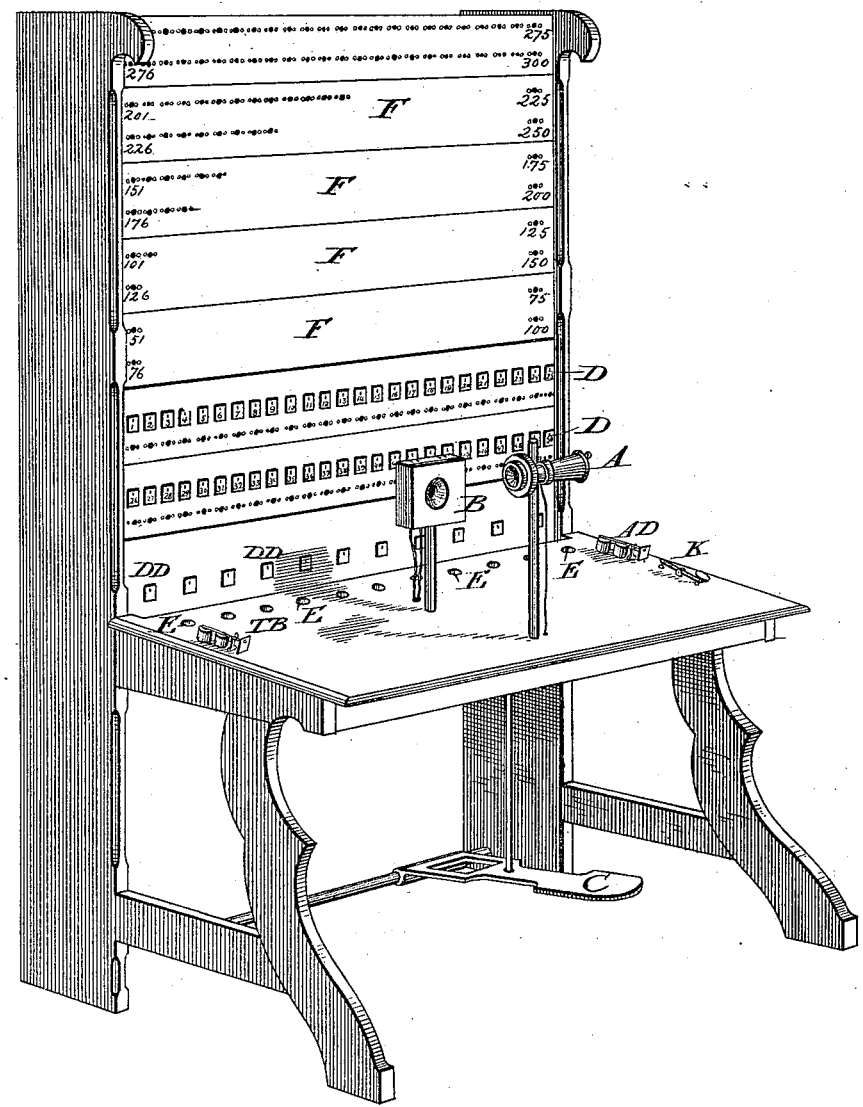

(No Model.) 12 Sheets—Sheet 1.
J. O. SHIRAS & E. A. ECKERT.
TELEPHONIC EXCHANGE SYSTEM AND APPARATUS THEREFOR.

No. 269,238. Patented Dec. 19, 1882.

Attest.
Sidney P. Hollingsworth.
Robt. L. Miller.

Inventors.
James O. Shiras
Edward A. Eckert
By Pancuison & Pancuison
Attorneys.

(No Model.) 12 Sheets—Sheet 2.

J. O. SHIRAS & E. A. ECKERT.
TELEPHONIC EXCHANGE SYSTEM AND APPARATUS THEREFOR.

No. 269,238. Patented Dec. 19, 1882.

*Fig. 2*

Attest.
Sidney P. Hollingsworth
Robt. L. Miller

Inventors.
James O. Shiras
Edward A. Eckert
By Pancuison & Pancuison
Attorneys.

(No Model.) 12 Sheets—Sheet 3.
J. O. SHIRAS & E. A. ECKERT.
TELEPHONIC EXCHANGE SYSTEM AND APPARATUS THEREFOR.

No. 269,238. Patented Dec. 19, 1882.

(No Model.) 12 Sheets—Sheet 4.
J. O. SHIRAS & E. A. ECKERT.
TELEPHONIC EXCHANGE SYSTEM AND APPARATUS THEREFOR.
No. 269,238. Patented Dec. 19, 1882.
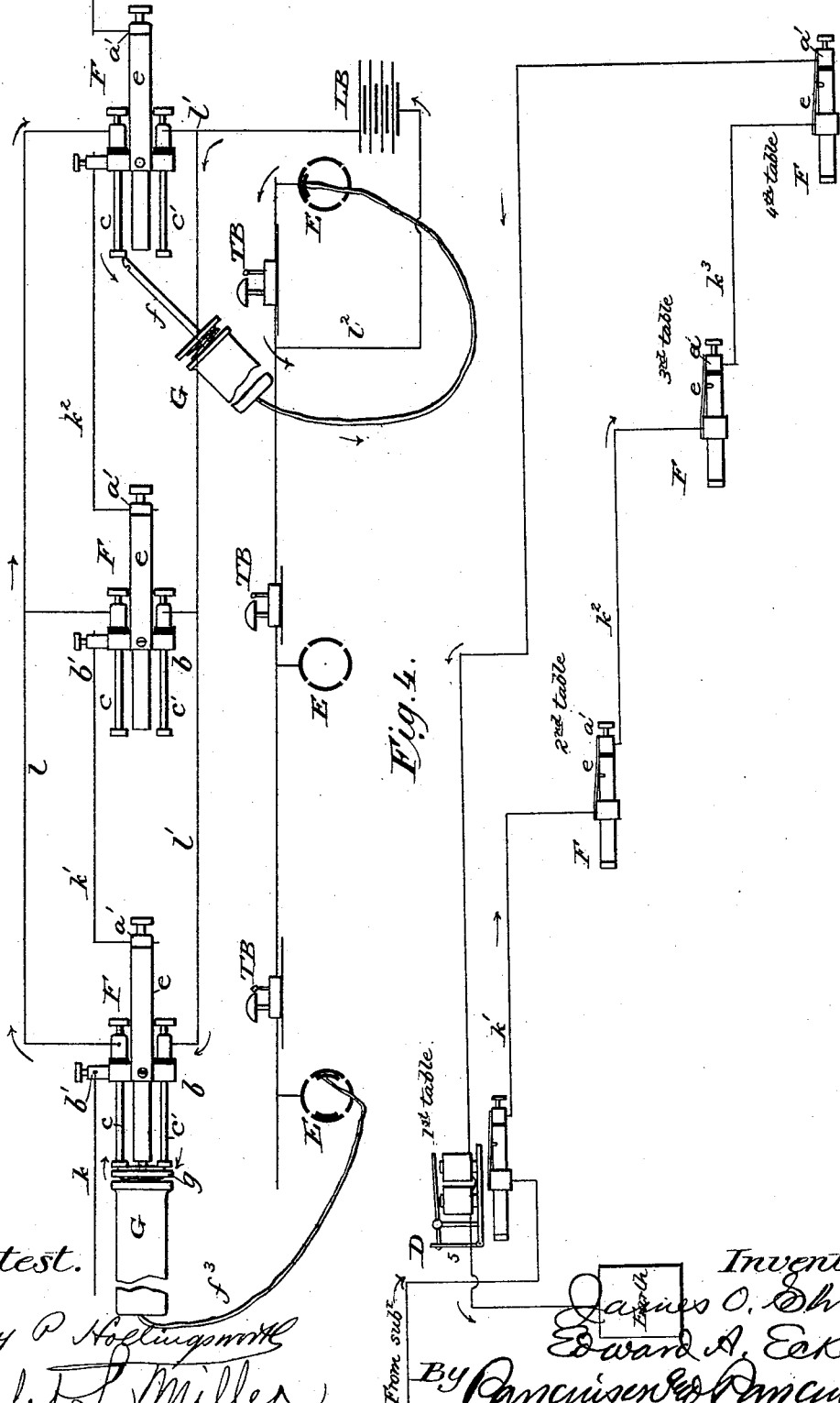
Attest.
Sidney P. Hollingsworth
Robt. L. Miller
Inventors.
James O. Shiras
Edward A. Eckert
By Vancuisen & Vancuisen
Attorneys (No Model.) 12 Sheets—Sheet 5.

J. O. SHIRAS & E. A. ECKERT.
TELEPHONIC EXCHANGE SYSTEM AND APPARATUS THEREFOR.

No. 269,238. Patented Dec. 19, 1882.

(No Model.) 12 Sheets—Sheet 6.
J. O. SHIRAS & E. A. ECKERT.
TELEPHONIC EXCHANGE SYSTEM AND APPARATUS THEREFOR.
No. 269,238. Patented Dec. 19, 1882.
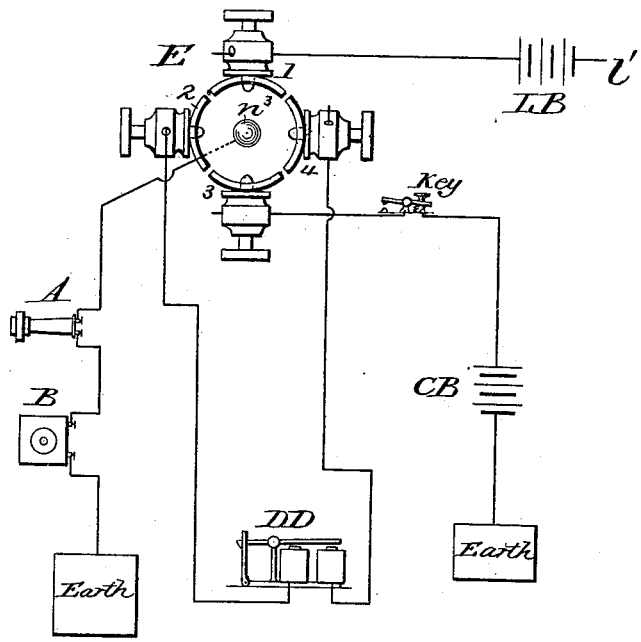
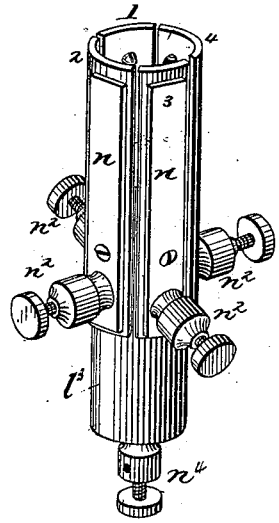
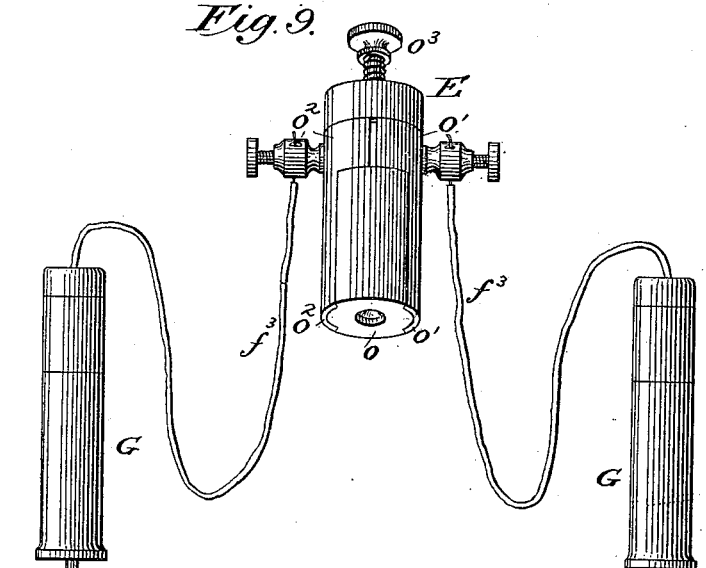
Attest.
Sidney P. Hollingsworth
Robt. L. Miller
Inventors.
James O. Shiras
Edward A. Eckert
By Ramison & Ramison
Attorneys.
N. PETERS, Photo-Lithographer, Washington, D. C.

(No Model.) 12 Sheets—Sheet 7.
J. O. SHIRAS & E. A. ECKERT.
TELEPHONIC EXCHANGE SYSTEM AND APPARATUS THEREFOR.
No. 269,238. Patented Dec. 19, 1882.
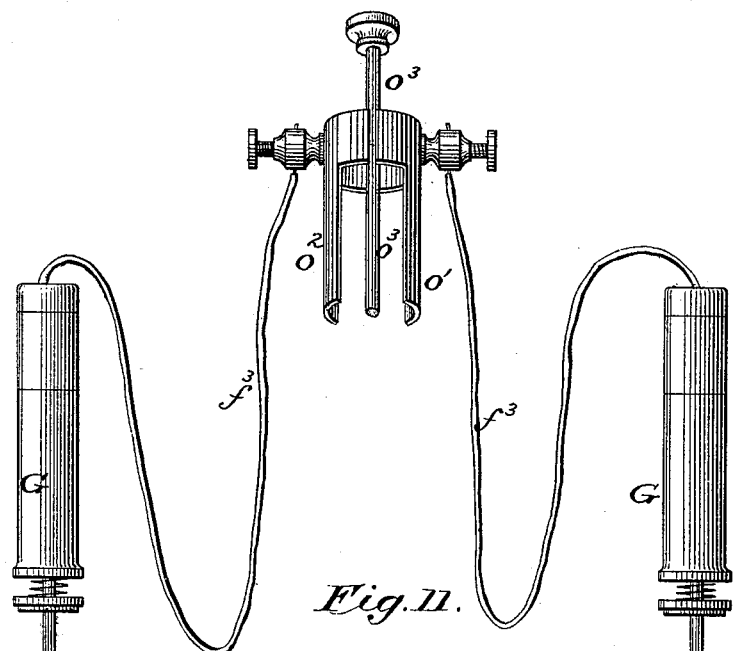
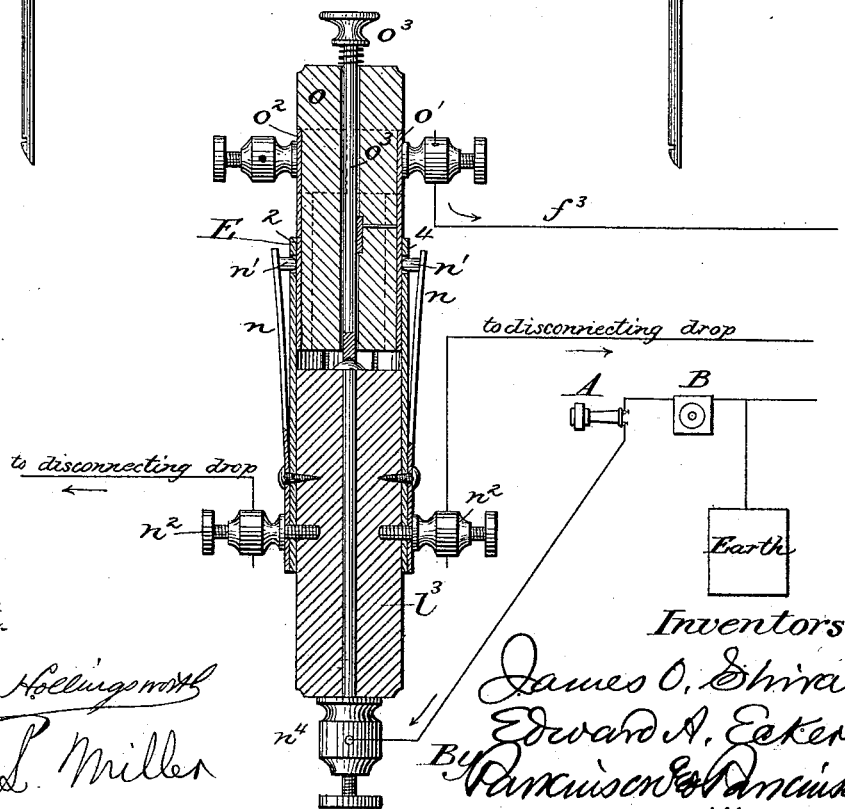

(No Model.) 12 Sheets—Sheet 8.
J. O. SHIRAS & E. A. ECKERT.
TELEPHONIC EXCHANGE SYSTEM AND APPARATUS THEREFOR.
No. 269,238. Patented Dec. 19, 1882.
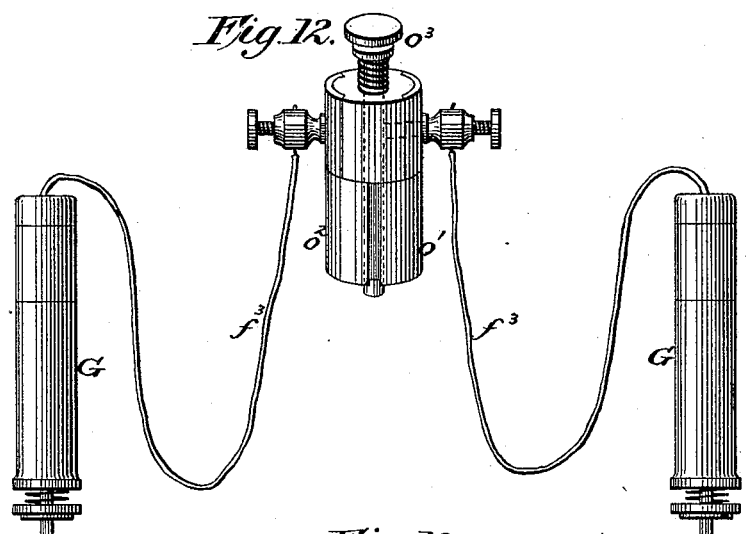
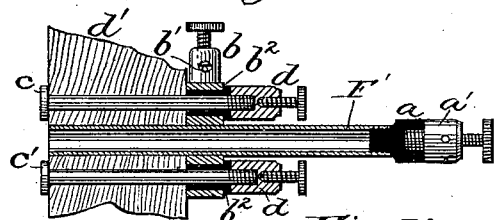
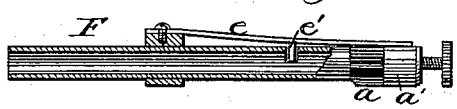
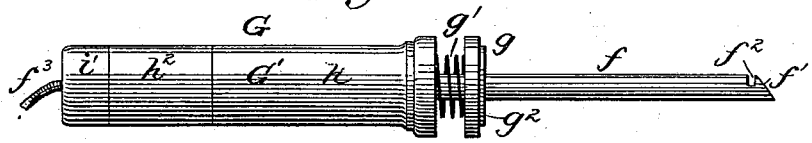
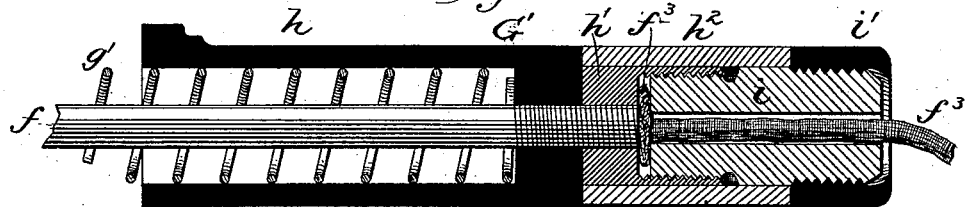

(No Model.) 12 Sheets—Sheet 9.

J. O. SHIRAS & E. A. ECKERT.
TELEPHONIC EXCHANGE SYSTEM AND APPARATUS THEREFOR.

No. 269,238. Patented Dec. 19, 1882.

Attest.
Sidney P. Hollingsworth
Robt. L. Miller

Inventors.
James O. Shiras
Edward A. Eckert
By Parkinson and Parkinson
Attorneys.

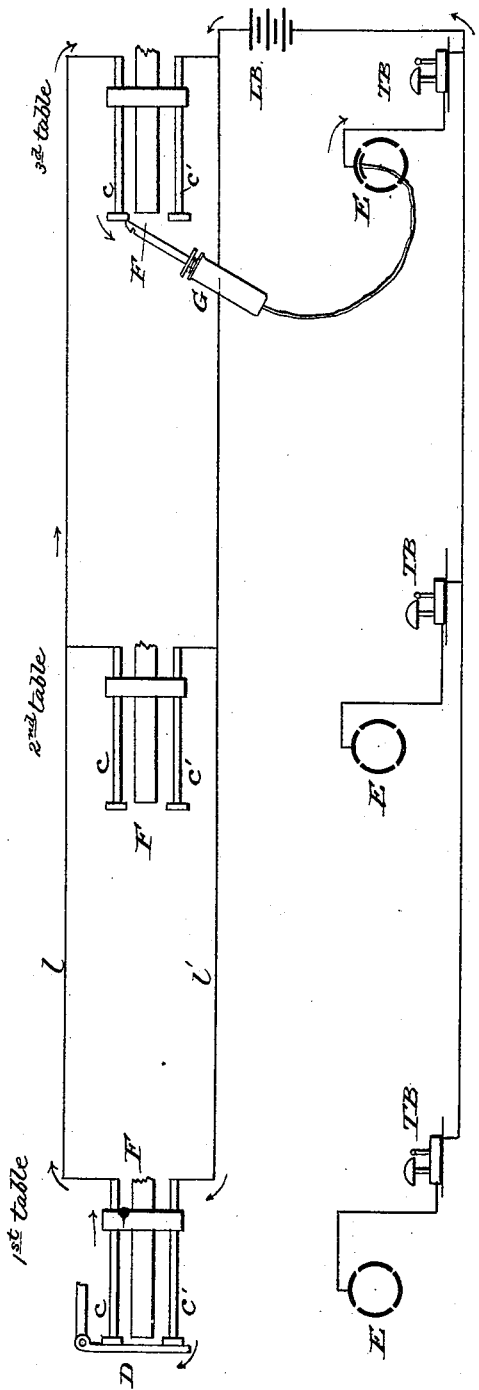

(No Model.) 12 Sheets—Sheet 11.
J. O. SHIRAS & E. A. ECKERT.
TELEPHONIC EXCHANGE SYSTEM AND APPARATUS THEREFOR.
No. 269,238. Patented Dec. 19, 1882.
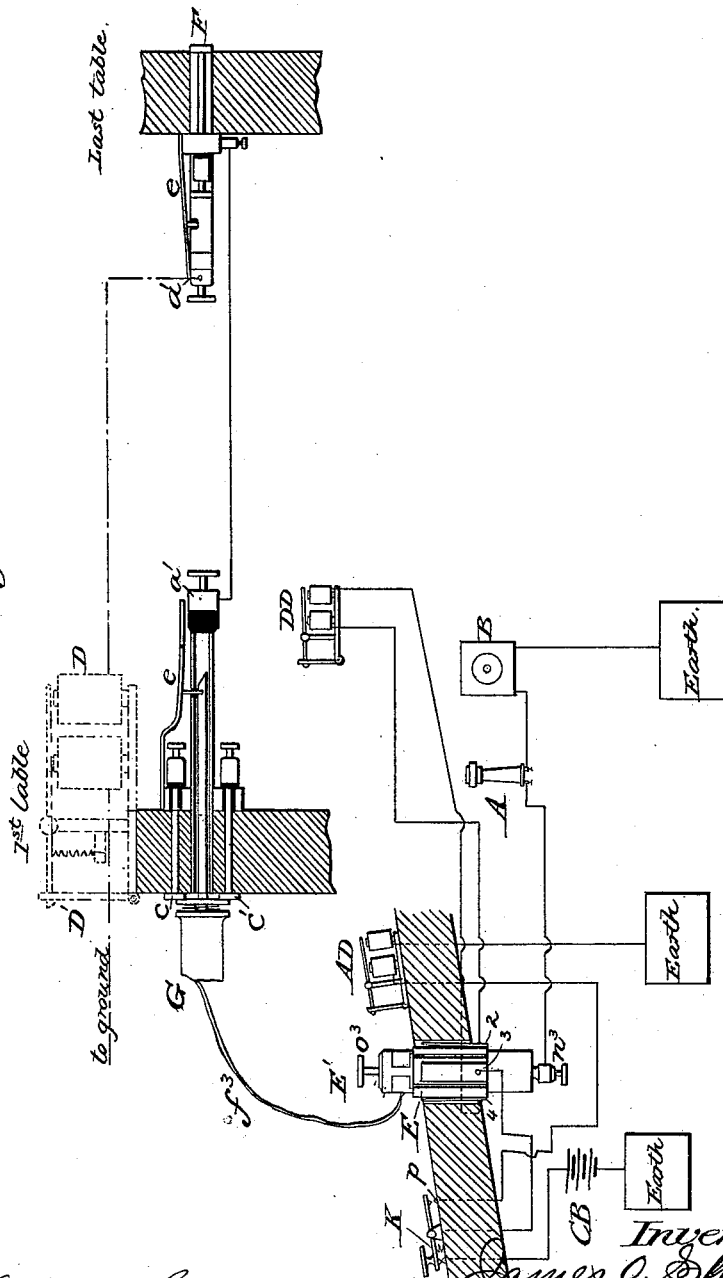

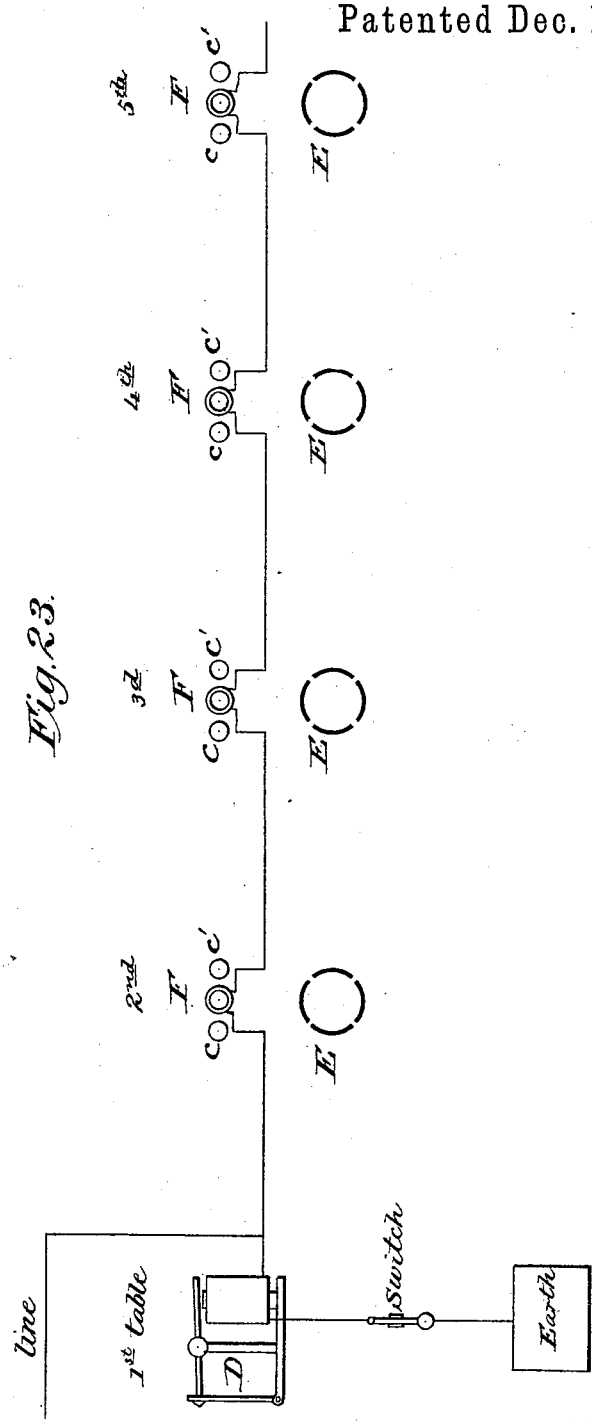

UNITED STATES PATENT OFFICE.

JAMES O. SHIRAS AND EDWARD A. ECKERT, OF CINCINNATI, OHIO.

TELEPHONIC EXCHANGE SYSTEM AND APPARATUS THEREFOR.

SPECIFICATION forming part of Letters Patent No. 269,238, dated December 19, 1882.

Application filed October 25, 1881. (No model.)

*To all whom it may concern:*

Be it known that we, JAMES O. SHIRAS and EDWARD A. ECKERT, both of Cincinnati, in the county of Hamilton and State of Ohio, have invented certain new and useful Improvements in Telephone-Exchange Systems and Apparatus Therefor, of which the following is a specification.

Our invention relates to that class of telephone-exchange systems wherein subscribers' drops or indicators are divided into groups, each group being placed upon an operating desk or table and under the personal care and supervision of the operator at that table. The Jones and Gilliland apparatus are types of this system. In these, as is well known, only a portion of the subscribers' wires is placed on one table—say fifty—and in this case, when the operator wishes to connect one of these fifty wires on his board with other wires on other boards, it must be done by means of dummy or transfer wires, and a ticket must be carried by a check-boy to the operator at the other table, this ticket explaining to him what line-wire to connect and also onto what dummy-wire to connect it; or, if the check-boy is not used, the first operator must, by means of telephone and transfer wires, give the necessary direction to the second operator. With this explanation it will be understood that each operator has individual control of fifty wires only. It is also manifest that to make the connection with a wire on another table it requires the joint action of two operators, and either the intervention of a telephone-circuit between them or the employment of a check-boy.

The object of our invention is to bring all the wires running into the exchange under the individual control of each operator, whereby he can individually call, connect, and disconnect any and all subscribers' wires without the intervention of the second operator or check-boy or tickets; and it consists in the combination, in telephone-exchanges in which subscribers' drops are divided into groups and each group is placed on a separate operating-table, of each operating-table with multiple groups of connection devices, each of said devices being in connection with a subscriber's wire, each group being integrally known and designated in the same manner as the group of drops to which its connection devices are connected; in the combination, in a telephone-exchange system in which subscribers' drops, trunk-lines, and employés' or officers' drops are divided into groups, and each group placed upon a separate operating-table under the care of one operator, of multiple groups of connection mechanism on each table, each group being connected with a separate group of drops, so that all the drops in the exchange are thus connected, each group of connection mechanisms being integrally known and designated in the same manner as the group of drops to which it is connected is known and designated, with connecting plugs or cords, test-battery, call-battery, telephone and transmitter, and disconnecting-drops, whereby each operator can answer, call up, and talk to every subscriber, trunk-line and trunk-line operator, exchange-operator, or any other person connected to the drop in the exchange, and can connect and disconnect each and every wire connected to a drop in the exchange; in the combination, in a telephone-exchange system in which subscribers' drops are divided into groups and each group placed on a separate operating-table under the care of one operator, of each subscriber's wire terminal with a series of connection mechanisms, the first connection mechanism of the series being usually placed beneath the subscriber's drop, the second connection mechanism on the switch-board of the second table in an integral group of connection mechanisms designated in the same manner as the group of drops to which they are connected, the third connection mechanism being placed on the switch-board of the third table in an integral group of connection mechanisms, designated in the same manner as the connection mechanisms of the second table and the drops of the first, and so on with all the connection devices of the series until the last is reached, which is disposed of on the switch-board of the last table in the same manner as the previous ones were disposed of, the last connection device being part of and forming the electric circuit for the extension of the subscriber's wire back to the first table, where the circuit goes through the subscriber's drop to the ground; in the combination, in a telephone-exchange substantially such as above explained, of each connection device with two rigid test-rods, one rod of each pair being connected to the corresponding rod of each pair on all the other connection devices in that series, and a bridge carried by the connection-plug to close the gap between rods of a pair, whereby a test-circuit is formed to enable each operator to ascertain if the wire is in use, and also to prevent the operator from using a subscriber's wire if that subscriber has called and is waiting for an answer from the operator in charge of the drop; in the combination, in a telephone exchange system substantially such as hereinbefore stated, of each connection mechanism on each operating-table with one or more circuit-closers on each table, each circuit-closer being in connection with the telephone-transmitter, test-battery and call-generator, and disconnecting-drop, and each of which circuit-closers can be brought into electrical connection with the connection devices by means of telephone, connecting-rods, and plugs or keys; in the combination, in a telephone-exchange system in which subscribers' drops are arranged in groups, as above stated, of each connection device with a plug, a cord, a socket-plug, and a socket, which socket is composed of several terminals insulated from each other, these terminals being connected with a telephone and transmitter, a generator for calling, a local battery for testing, and a disconnecting-drop; in an improved socket composed of several parts insulated from each other, which parts form the terminals of several electric circuits—to wit, one part being a terminal of a grounded open circuit including in its circuit a call or ringing-up battery closed by a key, another part being a terminal of a grounded circuit including the telephone and transmitter, another being a terminal of the circuit leading to one pole of a test-battery, another being a terminal of the circuit to one side of a disconnecting-drop, another being a terminal of the circuit leading to the other side of the disconnecting-drop; in the combination, with a socket substantially such as the foregoing, of a plug having cords and terminal pins for connection with the subscribers' and respondents' wires, and having connecting-surfaces insulated from each other and so arranged relative to the parts of the socket that connection may be made and broken, or a fresh connection made to bring another circuit into connection by turning said plug upon its axis while resting in the socket; in the combination, with a socket and plug, of a plunger normally in contact with one of the conducting-surfaces and connecting-cords of the plug and normally out of contact with the terminal rod of an operator's telephone-circuit in said socket; in the combination, with a socket and plug substantially of the character stated, and with the plunger whereby the terminal rod of the operator's telephone-circuit is thrown into electrical contact with a conducting-surface and connecting-cord on said plug, of a wire connecting two opposing surfaces of the socket and including in its circuit a disconnecting-drop, whereby when both subscriber and respondent have been connected the operator may talk with both by depressing the plunger; in an operator's table having drops and connecting-tubes for the terminals of a group of subscribers' wires, sockets for battery and ground connections, a telephone and disconnecting-drop, and a switch-board and numbered connecting-tubes connecting with all the remaining wires of the exchange; in combining with subscribers' wires having their drops arranged in groups at separate operating-tables, switch-connections for said wires at every other operating-table, a test-circuit including the drop-connection and each switch-connection, and having its contact established at the time the drop-shutter falls or a connection is plugged, a test-battery, and signaling mechanism, whereby a positive signal will be given in answer to a test at any operator's table whenever the drop has fallen or the line has been plugged at another table; in a connecting-tube having in contact therewith the terminal of a subscriber's wire and the terminal of a wire leading to the switch or subscribers' connections on the other tables, and provided with a spring break or bridge, which normally keeps said terminals in electrical contact with each other; in a connecting-tube having combined therewith insulated test rods or posts, a subscriber's wire, a circuit-wire leading to switch or subscribers' connections on the remaining tables of the series, then by return-wire to the table from which it starts, and through the drop to the ground and normally in contact with the subscriber's wire, and wires leading from the test-rods to corresponding test-rods on the connecting-tubes of the other table of the exchange; in the combination, with a connecting-tube having insulated test rods or posts separately connected to corresponding test-rods of other connecting-tubes, and also having a subscriber's wire insulated from said test-rods, of a circuit in normal contact with said subscriber's wire and connecting it to a tube upon every other table in the exchange, and a connecting plug or pin adapted upon being inserted to throw said subscriber's wire out of contact with the table-wire and into contact with the connecting-cord, and at the same time to throw the test-posts into contact with each other and establish a test-circuit; in so combining the test-posts of the connecting-tube with the drop-shutter of the subscriber's terminal that said shutter, when it falls to indicate a call, rests upon and throws the posts into contact one with another to establish a test-circuit, whereby operators at any other table may inform themselves that such a line has called and is for the time being blocked; in combining with the connecting-tube and its test-posts a connecting-rod bearing an elastically-seated insulated conducting-disk which comes in contact with the test-posts and throws them into electrical connection as the rod is inserted into the tube; in combining with the connecting-tube and its test-posts a connecting-rod bearing an elastically-seated insulated conducting-disk which forms the contact between the test-posts, and means whereby the length of said rod may be adjusted to compensate for different lengths of tube; in combining with the connecting-tube and its test-posts a connecting-rod bearing an elastically-seated insulated conducting-disk which forms the contact between the test-posts, and means whereby the force of said spring may be adjusted to increase the effectiveness of the contact between the disk and posts; and in the various other combinations and details of construction hereinafter described and claimed.

Figure 17:
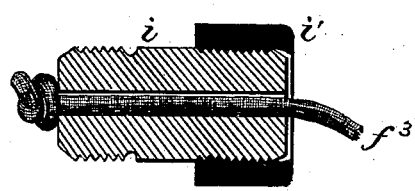
Figure 18:
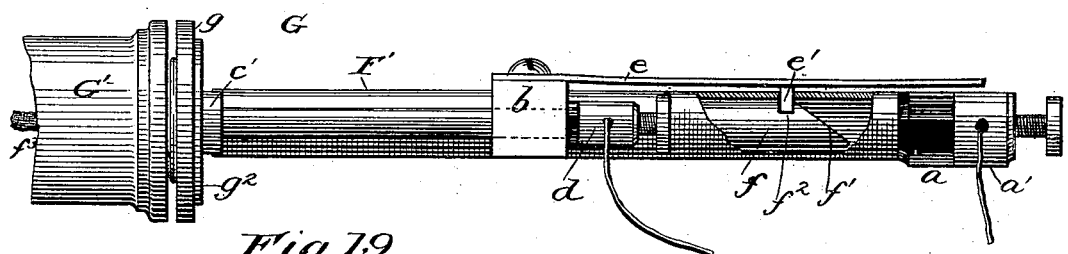
Figures 19, 20:
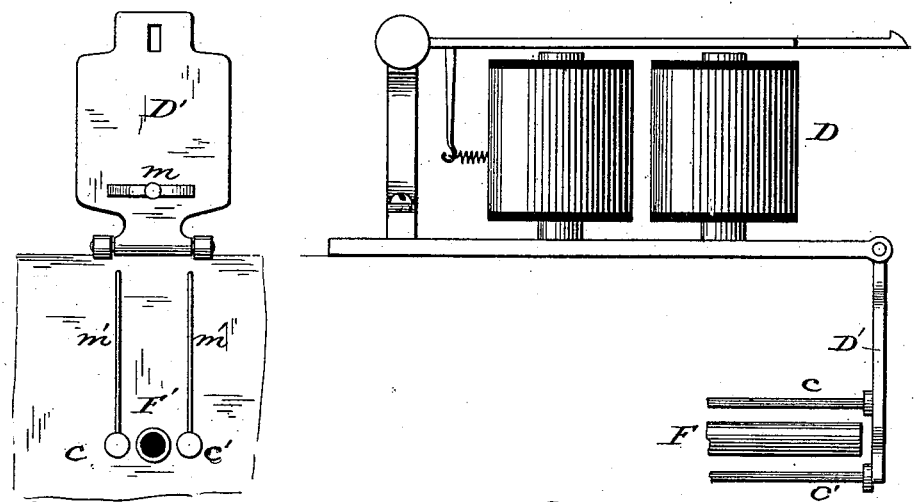

In the drawings, Figure 1 is a perspective view of an operator's table embodying features of our invention. Fig. 2 is a diagram including three tables, illustrating the arrangement of subscribers' drops and switch-connections upon any one table of the series, and serving to explain the arrangement for a greater number of tables; Fig. 3, a diagram including two tables to explain the course of subscribers' lines through the tables to their distant stations and ground-connections; Fig. 4, a diagram to explain the course of the subscribers' wires and the circuit through a series of tables; Fig. 5, a diagram showing two lines terminating on different tables connected to each other, and also the means for connecting and disconnecting; Fig. 6, a diagram illustrating subscribers' circuit and test-circuit through three tables, with the test-circuit in action; Fig. 7, a plan view of the table-plug socket with its connections; Fig. 8, a side elevation of the same with the connecting-wires omitted; Fig. 9, a perspective view of the socket-plug with connecting-cords and terminal connecting-rods; Fig. 10, a skeleton view of the metallic parts of said socket-plug; Fig. 11, a vertical section through the socket and its plug, showing how the two are brought into connection, and also how a telephone is brought into circuit for talking; Fig. 12, a modification of the socket-plug; Fig. 13, a bottom plan view of the connecting-tube and its test-posts, partly in section to show the mode of mounting it in frame-work; Fig. 14, a vertical longitudinal section through the same; Fig. 15, a perspective view of a connecting-plug adapted to operate with such connecting-tube; Fig. 16, a longitudinal section through said plug and its handle; Fig. 17, a detail view of a part of said plug; Fig. 18, the connecting-plug inserted into the connecting-tube, so as to throw the test-posts into electrical contact and disconnect the subscriber's wire from the circuit-wire going to the table; Fig. 19, an elevation of the drop-shutter in its proper relation to the connecting-tube; Fig. 20, a detail showing how the subscriber's drop-shutter throws the test-posts into electrical contact by its fall; Fig. 21, a diagram showing the circuit established when the drop-shutter has been allowed to fall upon the test-posts by a subscriber's call and another post in the line is touched by any operator; Fig. 22, a diagram including various mechanisms, and representing the course of the current when the connecting-tube has been plugged and the operator has depressed his call-battery key to ring the distant subscriber's bell; and Fig. 23, a modification showing the employment of an open electrical circuit for the purpose of testing.

The operator's table in our system is provided, as usual, with a telephone, A, a transmitter, B, a treadle or crank, C, for operating the generator or magneto-electric machine which rings the distant subscriber's bell. Instead of this generator, however, a voltaic battery may be used.

At the lower part of the upright portion or board of the operator's table are arranged a series of drops, D, corresponding to subscribers' terminals—say fifty in number, or thereabout—as usual in exchanges, and beneath each drop a connecting-tube for that subscriber, which connecting-tube and its accessories and contacts will be hereinafter fully described. The drops of the first table of the series, where the number is that above proposed, will be numbered from 1 to 50, which number will also indicate the corresponding connecting-tube. The drops of the second table will be numbered from 51 to 100, and the drops on the third table from 101 to 150, and so on through the series of tables. Any change in the number of drops to a table will of course be followed by a corresponding change in the consecutive numbers on the several tables.

Beneath the drops, and preferably parallel therewith on the desk portion of the operator's table, and, for convenience and compactness, along the angle formed by the desk portion with the board, are arranged a series of sockets, E, which in practice may be about one-fifth in number of the drops. These sockets receive the plug by which the connection is made between the subscriber and the call-battery and operator's telephone, and also between the subscriber and the respondent, and their construction, as well as that of the plug which they receive, will be fully described at the proper time.

A disconnecting-drop, D D, is provided for each socket, and these last-named drops will be advisably arranged at the lower angle of the board, immediately behind the sockets and beneath the subscribers' drops.

Upon the board, above the space devoted to the drops, are arranged in compact form a series of numbered connecting-tubes, F, in the aggregate and in their designating numbers corresponding to the drops of all the other operators' tables in the exchange—that is, supposing them to be arranged on the first table, the drops of which are numbered from 1 to 50, the connecting-tubes of this upper portion, which is properly the switch-board, will be numbered from 51 to 100 for the second table, from 101 to 150 for the third table, and so on, while on the second table, the drops of which are numbered from 51 to 100, the connecting-tubes on the switch-board will be numbered from 1 to 50 for the first table, from 101 to 150 for the third table, and so on, the connecting-tubes beneath the subscriber's drop on each table supplying the missing numbers on the switch-board. These connecting-tubes on the switch-board we prefer to arrange in groups corresponding to the group of subscribers' terminals with which they are connected, those for each operator's table by themselves, as shown, and these groups may be identified with their respective tables either by colors or by numbers, as found advisable. A subscriber's wire first comes to his connecting-tube beneath the drop on the table to which he is allotted, passes from that by means of a break-connection to the correspondingly-numbered connecting-tubes on the switch-board of the next table, thence from that to the correspondingly-numbered tubes on the switch-board of the third table, and so on through the series until it reaches the last, when it returns to his drop. This arrangement is clearly shown in the third figure of the drawings. Two test-circuit wires, insulated from each other, also run from the connecting-tube beneath each subscriber's drop through his switch-connections on the switch-boards of the other tables, one of these test-circuit wires being in connection with a wire or circuit passing through a test-battery and a test-bell or signaling device on each table to the series of sockets on said tables, the other wire having its ends free or disconnected, these test-circuit wires being insulated from the subscriber's circuit, and being bridged and consequently partially closed, ready for testing by his call, or in the act of plugging his connecting-tube or any of his switch-connections. In our system we work trunk-lines which connect branch exchanges in the same manner as subscribers' wires—that is, we treat these lines as subscribers' wires and run them to a connecting-tube beneath a drop on the operator's table, which may be a table devoted to trunk-lines, (or they may terminate indiscriminately in the various tables,) giving each trunk-line wire its appropriate number, then, by circuit-wires, running them to switch-boards on every other operator's table in the exchange, and providing them in like manner with test-circuits. Therefore each operator can test, call up, connect, or disconnect any trunk-line. These have heretofore been hard to handle, but by this system are made quite as easy as subscribers' lines.

For a proper understanding of the line of the current, we will now proceed to describe the connecting-tubes which we have invented, and which, or some equivalent thereof, will be found necessary in the working of our system.

F' is the tube proper, composed of metal and open at one end, at the other end being closed by some insulating material $a$—such as vulcanite—which receives at its outer end a metallic head, $a'$, screw-threaded or otherwise secured thereto. This head is perforated to receive the terminal of a wire, and is provided with a set-screw, whereby the wire may be jammed down into perfect electrical contact therewith.

At a short distance from the open end of the tube is a cross-piece or block, $b$, fast thereto, and having at one end a perforation, $b'$, to receive the terminal of the subscribers' wire, and a set-screw to insure its electrical contact. The wings of this block are also perforated parallel with the tube, and the perforations are lined with insulating material $b^2$ to receive the test-posts $c\ c'$, which extend out beyond the open end of the tube. These test-posts are or may be headed at their exposed ends. At their other ends they are screw-threaded to receive the cap or nut $d$, whereby they are secured to the tube after having been passed through their bearings, and whereby also they are made to serve as a strong and efficient means of securing the connecting-tube in the frame-work of the table. For the latter purpose they are passed through the strips $d'$ of the frame-work, which is suitably perforated, and also has a central aperture or socket to receive the end of the tube, then through their bearings, and have their caps or nuts applied, so that the bar is clamped between their heads and the outer face of the cross-piece $b$ upon the tube. This mode of securing is much more firm and secure than would be the use of ordinary screws, and, besides, gives an economy of parts, as the test-posts are made to serve dual functions. The nuts or caps of the test-posts are each perforated to receive the terminal of a wire, and provided with a set-screw to bind it in electrical contact.

Upon the cross-piece $b$ is secured a spring, $e$, which extends therefrom to contact with the head $a'$, bridging the insulating or non-conducting material between the tube and said head; and to insure perfect electrical contact the head may be flattened on the point where the spring touches it. About midway between the ends of the spring it is provided with a lug, $e'$, which takes into a slot in the tube, so as to project beyond its inner walls. While the spring is down and in contact with the head $a'$ it is evident that the terminal of the subscriber's wire bound to the cross-piece $b$ will be electrically connected with the terminal of the wire bound to said head; but if the spring is raised this connection will be broken. The wires attached to the test-posts will be permanently out of connection with either of these last-mentioned terminals. For the purpose of operating this connecting-tube, we employ a plug, G, which forms a terminal point of one of the connecting-cords usual in exchanges. This plug is composed primarily of a metallic rod, pin, or spindle, $f$, which fits easily into the tube, and its forward end is beveled, as at $f'$, and at a slight distance behind the bevel has a notch, $f^2$. At its rear end it is provided with an insulating-handle, G', and is in electrical contact with the end of the connecting-cord $f^3$. When it is introduced into the tube its beveled end will push up the lug $e'$ upon spring $e$ and break the contact between that spring and the head $a'$ of the tube, and when it has been pushed home the lug upon the spring will drop into the notch $f^2$ and hold it fast, the notch, however, being so shallow that the spring is still kept from contact with the head $a'$, and the connection between that and the subscriber's wire remains broken. To disengage the spindle from the socket it need only be turned upon its axis until the lug has ridden up its periphery out of the notch, when it can readily be withdrawn.

Upon the shank of the spindle is a disk, $g$, which on its forward side is stopped by a shoulder on the spindle, and on the rear side is seated against a coiled spring, $g'$, received in a suitable socket in the handle. The main portion of this disk, and that part of it in contact with the spindle, is composed of insulating material, and on its face it is provided with a metallic annular or equivalent conducting-surface, $g^2$, which surface, when the spindle is forced down into the connecting-tube, is pressed by the spring against the heads of the test-posts, so as to bring them into electrical contact with each other.

We prefer to construct the handle in such a manner as to allow of the adjustment of the spindle as to length, and also to permit of the ready removal of the connecting-cord and its replacement by another in case this is desirable. To this end we form the handle with a socket portion, $h$, which has a cylindrical recess to receive the coil-spring, and at its rear end is closed and has a central screw-threaded aperture, into which the screw-threaded rear end of the spindle is inserted to a greater or less extent, as may be desired. That portion of the spindle projecting rearwardly from the socket-piece takes into and holds one end of the double nut $h'$, which beyond this has an enlarged screw-threaded socket to receive the cap piece $i$. The connecting-cord $f^3$ passes centrally through an aperture in this cap-piece, and at its inner end is bunched or bent down, so as to prevent escape. The periphery of the cap-piece is covered by an insulating-sleeve, $i'$, in case the cap-piece itself is not made of insulating material. This sleeve will be secured by screw-thread or otherwise, as shown. A loose sleeve, $h^2$, is also provided to go over the double nut $h'$, and when the cap-piece is screwed into position it will hold the sleeve in place, and will also jam the exposed ends of the connecting-cord into electrical contact with the spindle or plug-rod.

As already stated, one of the connecting-tubes just described is placed under each subscriber's drop on each operator's table, and is known by the number given to said drop; and above the space alloted to these drops, in what we term the "switch-board," other similar connecting-tubes are arranged in compact order and numbered individually to correspond with the subscribers' drops on every other table in the exchange, so that if there are five hundred subscribers, and fifty to a table, there will be fifty tubes beneath the drops on one table and four hundred and fifty tubes upon the switch-board of that table. Taking the first table for illustration, and the wire $k$ leading to subscriber No. 5, (see Fig. 6,) this wire has its terminal in the aperture $b'$ in the cross-piece $b$ of the connecting-tube beneath his numbered drop, and by means of the break-spring is normally in electrical contact with the circuit-wire $k'$, attached to the head in this connecting-tube, and wire $k'$ runs to the cross-piece $b$ of connecting-tube No. 5 on the switch-board of the second table, thence, by means of the break-spring and head-piece $a'$ of that connecting-tube, connects with wire $k^2$, which runs to the cross-piece of connecting-tube No. 5 on the switch-board of table No. 3, and, reaching the last table, the current returns through break-spring, head-piece, and wire on that table to subscriber's drop No. 5 on table No. 1, and to the ground. The subscriber's drop will therefore normally be in circuit to respond to his call; but whenever the operator introduces the plug in answer to this call the drop and all intermediate switch-connections will at once be cut out of circuit, and at the same time, by means of the disk on the plug, the test-circuit will be partially established. This latter circuit is composed as follows: From test-post $c$ upon, for example, this subscriber's drop, No. 5, a wire, $l$, leads successively to each corresponding test-post of the connecting-tubes similar in number on the switch-boards of the other tables of the series, and from the test-post $c'$ of the connecting-tube on the last switch-board a wire, $l'$, returns successively to each test-post $c'$ of the series until it reaches the test-post $c'$ of the first connecting-tube. This last wire, $l'$, has a contact with a local or test battery, L B, the opposite pole of this battery being electrically connected by a wire, $l^2$, with a test-bell, T B, or "buzzer," or drop, or signal device, whichever is used on each table, each test-bell being in electrical contact with a terminal in every plug-socket upon its table. An operator at the third or any other table may now complete the test-circuit by plugging a socket and touching the head of the test-post $c$ with the terminal of connecting-cord on said socket-plug, and the bell or signal device, being actuated by the current, will at once give notice that the line is in use; but should it not be in use there will be no test-circuit, no current, and no signal from his bell, and he may at once proceed to call the line.

When a subscriber calls it often happens that the operator is engaged in answering other calls. There will therefore be an interval after his call during which his connecting-tube will remain unplugged. In order to establish the test-circuit during this interval to prevent any other operator interfering with the line, we arrange the drop and connecting-tube in such relation to each other that when the drop-shutter falls to announce a call it strikes and rests against the heads of the test-posts and brings them into electrical contact with each other, remaining down until the operator is ready to plug the tube, so that from the moment of the call a signal will be given in answer to any test.

An efficient means of insuring electrical contact between the drop-shutter D' and the heads of the test-posts is shown in Fig. 20. Upon the shutter is secured a curved spring, $m$, and projecting upwardly from each test-post is a wire, $m'$, into such position that when the shutter falls the ends of its spring will rest upon and electrically connect the two wires, being firmly pressed against them by the leverage of the shutter.

The plug-socket E is composed of several terminals insulated from each other. The form which we have shown has four terminals, numbered respectively 1, 2, 3, and 4, substantially as shown in Figs. 7, 8, and 11, each terminal being a metallic strip segmental in cross-section, so that the socket may be cylindrical and attached at its base to the non-conducting block $l^3$, by which its insulation is maintained. Each metallic strip or terminal is, for perfect contact, provided with a spring, $n$, bearing at its end a lug, $n'$, which projects through an aperture on the strip, so as to come into rubbing contact with the plug, and at the base of the strip or spring is a binding-screw, $n^2$, to receive the terminal of appropriate wires. Centrally through the insulating bottom or body of the socket rises a pin, $n^3$, which we will call herein the "telephone-rod," for the reason that by means of the binding-screw $n^4$ and the wire it is in electrical contact through a telephone and transmitter to the ground. The terminal 1 of the socket is connected by a wire with the test-bell and test or local battery, the other pole of which, as above stated, is connected with a wire, $l'$, of the test-rods $c'$. The terminals 2 and 4 are connected with the operator's disconnecting-drop D D by independent wires, and establish a circuit to that drop, and the terminal 3 is connected by a wire through call-battery key with the call-battery C B, and thence to the ground.

The socket-plug E' is composed of a body, $o$, of insulating material, and bears two separate conducting-surfaces, $o' o^2$, supported thereon, each of which has a binding-screw to receive the terminal of a conducting-cord, $f^3$, provided at its end with a connecting-plug—such, for instance, as above described. The conducting-surface $o'$ is in electrical contact with a plunger, $o^3$, which passes centrally through the rod, and is spring-seated, so that it may be normally in an elevated position. This electrical contact between the surface and plunger may be either by means of a flexible wire between the two or else a rubbing contact, as in the modification shown in Fig. 12. The plunger, if depressed while the socket-plug is in the proper position, will come in contact with the telephone-rod and connect the telephone through the connecting-cord and connecting-plug with a wire to a distant station, so that the operator may talk to the subscriber or respondent at that station. By turning the plug axially its conducting-surfaces $o' o^2$ may be brought into contact with the terminals 1 and 3 or 2 and 4 of the socket, so as to bring into or throw out of action the test-battery and test-bell through terminal 1, the call-battery through terminal 3, or the disconnecting-drop through terminals 2 and 4, these all being, in addition to the telephone-circuit, established by the depression of the plunger.

The construction of the plug-socket and the connection given its terminals enable us to tap or milk the wires—that is, to talk to both subscriber and respondent at the same time. As the plunger is, in rubbing or otherwise, in electrical contact with the conducting-surface $o'$ of the socket-plug, and therefore with the binding-post thereon, whenever the plug is so placed as to bring this conducting-surface in contact with socket terminal 1 and the opposite conducting-surface, $o^2$, in contact with socket terminals 3, and the connecting-plugs are inserted one in the caller's tube and the other in the respondent's, it will follow, upon the depression of the plunger into contact with the telephone terminal, that the current will flow from the telephone A and microphone B, by their permanent wire, through telephone terminal $n^3$ and plunger $o$, thence to the conducting-surfaces $o'$, where it splits, one portion going by way of the immediate connecting-cord, connecting-plug, and tube to one of the parties at his distant station, and the other, by conducting-surface $o'$, to socket terminal 1, thence by wire to disconnecting-drop and socket-terminal 3, conducting-surface $o^3$, and the second connecting-cord, connecting-plug, and tube to the remaining party, thus enabling each party to hear what the operator is saying to the other.

Besides the mechanism already mentioned, the operator's table is further provided with an answer-drop, A D, one terminal of which is grounded and the other connected to the back contact, $p$, of the call-battery key K, so that when said key is released after a call and returns to its normal position of rest the terminal 3 of the plug-socket will be in circuit with the answer-drop and the latter will be actuated by the response of the party called.

The operation of our invention is as follows: Supposing Smith wishes to talk to Jones, Smith rings his bell, which causes the annunciator on the operator's table—say table No. 1—to drop. If the operator at table No. 1 has some other calls to attend to and keeps Smith waiting, no other operator will call for Smith, as the shutter on his drop has by its fall partially closed the test-circuit, so that all the other operators, upon testing, will be informed that the line is occupied, and will not interfere. The course of the test-circuit in this case, should any operator test while the shutter of Smith's drop is down, is indicated in Figs. 6 and 21, the arrows flying with the flow of the current—that is, the course is from the battery, past the intermediate series of test-posts $c'$, to the post beneath the subscriber's drop, then through the shutter to the opposite test-post, c, and back through the several switch-boards to the testing-contact, thence through connecting-cord to the plug-socket terminal 1 on the table of the operator testing, and by test-bell to battery. The test-rods of Smith's line at table No. 1 are directly beneath his drop. His test-rods on all the other tables are placed on the switch-boards of those tables. The operator at table No. 1 now having time to answer Smith's call, does so, first by putting back the shutter of the drop, then inserting the connecting-cord plug—say that one in contact with conducting-surface $o'$—into the tube directly beneath Smith's drop, then placing the socket-plug into the socket E, Fig. 22, in such manner as to bring the terminal 3 of the ringing or call battery in electrical contact with the connecting-cord and the connecting-plug which he inserted into Smith's connecting-tube. Having done this, he depresses the call-battery key K, and the current goes out onto Smith's wire and rings Smith's bell in his office, announcing to Smith that his call was received. The insertion of the plug into the connecting-tube raises the break-spring out of the back contact, $a'$, which prevents the call current from flowing toward other tables. The operator, having answered Smith by ringing his bell, throws on the telephone, and, by talking, ascertains his wants. To do this he gives the plug-socket a quarter-turn, which breaks the connection between its conducting-surface $o'$ and the terminal 3 of the socket, throwing out the call-battery and answer-drop circuit and bringing the conducting-surfaces $o'$ and $o^2$ into contact with terminals 2 and 4 of the socket, which terminals, by connecting-wires, form a partial circuit including the disconnecting-drop, then depresses the plunger of the socket-plug until it touches the end of the telephone rod or terminal. The conducting-surface $o'$ of the socket-plug is in rubbing or other contact with the plunger. Hence only the current in contact with the plunger will flow onto this conducting-surface, and thence to the connecting-cord. The plunger being brought into contact with the telephone rod completes the telephone-circuit from the ground in the exchange to Smith's distant station by the following route: from ground by microphone to telephone, to the telephone-rod, by contact onto the plunger, by rubbing or wire contact onto the conducting-surface of the socket-plug and the connecting-cord, to the connecting-plug, to Smith's connecting-tube, onto the brass shoulder or cross-piece used in attaching said tube to the operating-table, finally by wire to Smith's office, and then to the ground. The operator, having talked with Smith, finds that he wishes to communicate with Jones. He then tests Jones's line to see if it is in use, and does this with the other connecting-rod by touching with the plug the lower test-post, or, if the two test-posts are in horizontal position, then the left-hand post, first, however, turning back the socket-plug to bring its conducting-surfaces in contact with socket terminal 1 of the test-battery and socket terminal 3 of the call-battery and answer-drop. If the test-bell, or buzzer, or drop, or signaling device, whichever is used, is actuated, the operator tells Smith that Jones's line is in use. If, however, no signal is given, the operator inserts the second connecting-cord plug into Jones's connecting-tube, the first plug remaining all this time in Smith's connecting-tube. Now, if Jones's drop is on operating-table No. 1, his connecting-tube will be found directly beneath his drop; but if his drop is on some other table—say table No. 3—the connecting-tube which the operator in this case must use will be found on the switch-board portion of table No. 1, and Jones's tube will be found in that group of tubes connected with drops of table No. 3, and will be identified by a number corresponding with Jones's number on that table. Then the operator depresses the call-battery key, when the current flows out onto Jones's line and rings the bell in his office. Jones, hearing the bell, replies by turning his crank. The current flows to the exchange and operates the answer-drop on the operator's table, as the call-battery key, on being released, has sprung back into its normal position, resting upon back contact, $p$, which connects by permanent wire with the answer-drop, as in Fig. 22. The conducting-surface $o^2$ of the socket-plug being now in contact with the terminal 3 of the socket, it might be supposed that the test-battery would in some manner disturb Smith either at the time of testing Jones's line or when calling him, since Smith's line would be connected with the test-battery by means of terminal 1 of the socket and conducting-surface $o'$ of the socket-plug and connecting-cord; but the test-battery works on a strictly metallic circuit, and has no ground-connections. So, although one pole of the battery is in this case thrown on Smith's line, no current will flow, as there is no path to complete the circuit to the other pole of the battery, the test-rods being insulated from the line-wire of Smith and all other line-wires. Jones having answered, the operator again turns the socket-plug, brings its conducting-surfaces into contact with the terminals 2 and 4, depresses the plunger, and by telephone informs Jones that Smith wishes to talk with him. As terminals 2 and 4 of the socket are both connected with each other by means of a wire passing from one to the other, and in its path traversing an electro-magnet that forms the disconnecting-drop, if any current is now thrown onto Jones's line by means of the terminal 2 of the socket the same current will split at said terminal and a portion flow onto the wire, running through the disconnecting-drop to terminal 4, thence by conducting-surface of the socket-plug to Smith's socket-cord. Therefore when the operator announces to Jones that Smith wishes to talk with him, Smith as well as Jones hears the announcement. The two parties are now connected together under the following conditions: (a) they cannot be interfered with, as testing will prevent that; (b) both Jones's and Smith's drops are cut out of circuit by the insertion of their connecting-plugs, so that when either rings off there is no danger of his drop being actuated; (c) the disconnecting-drop is in circuit, which will announce to the operator when to disconnect them. The parties having rung off, the plugs are withdrawn and cords allowed to hang down loose.

Having thus described our invention, we would state that the principle of our improved exchange system is not confined to the precise mechanism herein described, since, for instance, we may substitute for the circuit-wire extending from the subscribers' terminals through the series of switch-connections an open electrical circuit extending from the line side of the subscriber's drop to the switchboard of the other operating-tables, as in Fig. 23, employing suitable means for switching the ground-wire off of the connection with subscribers' and circuit wires, leaving the two latter still connected, so that an operator, by plugging the switch-connection, may cause the subscriber's drop to fall as if the subscriber himself had called, thus notifying the operator at that subscriber's table, who, upon ascertaining the source of the call, will proceed to break the ground-connection. The specific arrangement and mechanical devices employed in this modification may hereafter be made the subject of a separate application.

We claim—

1. The combination, in a telephone-exchange system in which subscribers' drops are divided into groups, each group upon a separate operating-table, of each operating-table with multiple groups of connection devices, each of said devices being in permanent connection with a subscriber's wire, each group being known and designated in the same manner as the group of drops to which its connection devices are connected.

2. The combination, in a telephone-exchange system in which subscribers' drops are divided into groups, each group upon a separate operating-table, of multiple groups of connection devices upon each table, each of said devices being in connection with a subscriber's wire, each group being integrally known and designated in such manner as to identify it with the table bearing the group of subscribers' wires to which it is connected, and each individual connecting device being known and designated by the number, sign, or mark which identifies the individual subscriber with whose wire it is connected.

3. The combination, in a telephone-exchange system, with subscribers' drops, trunk-line drops, and employés' and officers' drops divided into groups, and each group placed upon a separate operating-table under the care of one operator, of multiple groups of connection mechanism on each table, each group being connected with a separate group of drops, so that all the drops in the exchange are thus connected, each group of connection mechanism being integrally known and designated in the same manner as the group of drops to which it is connected is known and designated, connecting plugs and cords, test-battery and call-battery, telephone and transmitter, and disconnecting-drops, whereby each operator can answer, call up, and talk to every subscriber, trunk-line, and trunk-line operator.

4. The combination, in a telephone-exchange system in which subscribers' drops are divided into groups and each group placed on a separate operating-table under the care of one operator, of each subscriber's wire terminal with a series of connection mechanisms, the first connection mechanism of the series being usually placed beneath the subscriber's drop, the second connection mechanism on the switchboard of the second table in a defined group of connection mechanisms designated in the same manner as the group of drops to which they are connected, the third connection mechanism being placed on the switch-board of the third table in a defined group of connection mechanisms designated in the same manner as the connection mechanisms of the second table and the drops of the first, and so on with all the connection devices of the series until the last is reached, which is disposed of on the switch-board of the last table in the same manner as the previous ones were disposed of, the last connection device being part and forming the electric circuit for the extension of the subscriber's wire back to the first table, where the circuit goes through the subscriber's drop to the ground.

5. The combination, in a telephone-exchange system substantially such as above explained, of each connection device with two rigid test-rods, one rod of each pair being connected to the corresponding rod of each pair on all the other connection devices in that series, and a bridge carried by the connection-plug to close the gap between the rods of a pair, whereby a test-circuit is formed to enable each operator to ascertain if the wire is in use, and also to prevent the operator from using a subscriber's wire if that subscriber has called and is waiting for an answer from the operator in charge of the drop.

6. The combination, in a telephone-exchange system substantially such as hereinbefore stated, of each connection mechanism on each operating-table with one or more circuit-closers on each table, each circuit-closer being in connection with the telephone, transmitter, test-battery, call-generator, and disconnecting-drop, and each of which circuit-closers can be brought into electrical connection with the connection devices by means of telephone-connecting cords and plugs or keys.

7. The combination, in a telephone-exchange system in which subscribers' drops are arranged in groups, as above stated, of each connection device with a plug, a cord, a socket-plug, and a socket, which socket is composed of several terminals insulated from each other, these terminals being connected with a telephone and transmitter, a generator for calling, local battery for testing, and a disconnecting-drop.

8. An improved socket, composed of several parts insulated from each other, which parts form the terminals of several electric circuits—to wit, one part being a terminal of a grounded open circuit, including in its circuit a call or ringing-up battery closed by a key, another part being a terminal of a grounded circuit including the telephone and transmitter, another being a terminal of the circuit leading to one pole of a test or local battery, another being a terminal of the circuit to one side of a disconnecting-drop, another being a terminal of the circuit leading to the other side of the disconnecting-drop.

9. The combination, with a socket substantially such as described, of a plug having cords and terminal pins for connection with the subscribers' and respondents' wires, and having connecting-surfaces insulated from each other and so arranged relative to the parts of the socket that connection may be made and broken or a fresh connection made to bring another circuit into connection by turning said plug upon its axis while resting in the socket.

10. The combination, with a socket and plug, of a plunger normally in contact with one of the conducting-surfaces and connecting-cords of the plug and normally out of contact with the terminal rod of an operator's telephone-circuit in said socket.

11. The combination, with a socket and plug substantially of the character described, and with the plunger, whereby the terminal rod of the operator's telephone-circuit is thrown into electrical contact with a conducting-surface and connecting-cord on said plug, of a wire connecting two opposing conducting-surfaces of the socket and including in its circuit a disconnecting-drop, whereby when both subscriber and respondent have been connected the operator may talk with both by depressing the plunger.

12. The combination, with the series of plug-sockets, of the key and answer-drop, substantially as described.

13. The combination of the plug, the plug-socket, and its call-battery terminal, the call-battery key, and the answer-drop, substantially as described.

14. The combination, with the plug-socket, of the answer-drop, call-battery, and disconnecting-drop, substantially as described.

15. The combination, with the plug-socket, of the answer-drop, disconnecting-drop, test bell or drop, call-battery, and telephone, as set forth.

16. The combination of the plug and its two conducting-surfaces, the plug-socket and its two disconnecting-drop terminals, and the disconnecting-drop, substantially as described.

17. The combination of the plug, its plunger, and two conducting-surfaces, and the plug-socket, its telephone terminal, and two opposing terminals connected by permanent wire, whereby the operator may talk to both subscriber and respondent at the same time.

18. The combination of the plug, its plunger, and two conducting-surfaces, the plug-socket, its telephone terminal, and two opposing terminals connected by permanent wire, and the disconnecting-drop through which said wire passes.

19. An operator's table provided with a series of plug-sockets, a disconnecting drop to each socket, a group of drops and connecting-tubes for the terminals of subscribers' wires, a switch-board having connections for the subscribers' wires of every other table, a telephone and transmitter, a disconnecting-drop and answer-drop, and a test-bell or signal device, all arranged substantially as described.

20. In combination with subscribers' wires having their drops arranged in groups at separate operating-tables, switch-connections for said wires at every other operating-table, a test-circuit including the drop-connection and each switch-connection, and having its contact established at the time the drop-shutter falls or a connection is plugged, a test-battery, and signaling mechanism, whereby a positive signal will be given in answer to a test at any operator's table whenever the drop has fallen or the line has been plugged at another table.

21. A connecting-tube having combined therewith insulated test rods or posts, a subscriber's wire, a circuit-wire leading to switch or subscribers' connections on the remaining tables of the series, then by return-wire to the table from which it starts, and through the drop to the ground, and normally in contact with the subscriber's wire and wires leading from the test-rods to corresponding test-rods on the connecting-tubes of the other tables of the exchange.

22. The combination, with a connecting-tube having insulated test rods or posts separately connected to corresponding test-rods of other connecting-tubes, and also having a subscriber's wire insulated from said test-rods, of a circuit-wire in normal contact with said subscriber's wire and connecting it to a tube upon every other table in the exchange, and a connecting-plug or pin adapted upon being inserted to throw said subscriber's wire out of contact with the table-wire and into contact with the connecting-cord, and at the same time to throw the test-posts into contact with each other and partially establish a test-circuit.

23. The combination, with the test-posts of the connecting-tube, of the drop-shutter of the subscriber's terminal, arranged in such manner that when it falls to indicate a call it rests upon and throws the posts into contact one with another to establish a test-circuit, whereby operators at any other table may inform themselves that such a line has called and is for the time being blocked.

24. In combination with the test-posts having upwardly-extending wires, the drop-shutter provided upon its face with a bent spring or bridge, as set forth.

25. In combination with the connecting-tube and its cross-piece, and with the frame-strip of the table bored to receive it, the headed test-posts passing through said frame-strip and cross-piece and binding the tube in position.

26. In combination with the connecting-tube and its cross-piece, the insulated test-posts clamping it to the frame-strip, and the nuts securing the threaded ends of said posts beyond the cross-piece, and provided with binding-screws for the terminals of the test-wires.

27. In combination with the connecting-tube and its cross-piece, the test-posts insulated in such cross-piece, the binding-screw for the line-wire set in one of the wings of the cross-piece, the insulating-block closing the rear end of the tube, the metallic head set in such block and provided with a binding-screw for the terminal of a table or ground wire, and the break-spring riveted to the cross-piece, resting at its free end upon the metallic head, and provided with a lug depending through a slot in the tube, whereby it may be raised out of contact with such head by the insertion of the connecting rod or plug.

28. In combination with a connecting-tube, a spring which normally brings the subscriber's wire into electrical connection with a table or ground wire, a lug upon said spring, and a connecting rod or pin beveled and notched upon one side, which, being inserted, lifts the spring by means of its bevel to break the connection with the table or ground wire and establish a new one with the connecting-rod, and then receives the lug into its notch, whereby it is held from accidental escape, and is disengaged by turning upon its axis, substantially as described.

29. In combination with the connecting-tube and its test-posts, a connecting rod or plug carrying upon its shank an insulated conducting-disk to bridge the electrical gap between said posts.

30. In combination with the connecting-tube and its test-posts, a connecting-rod bearing an elastically-seated insulated conducting-disk, which comes in contact with the test-posts and throws them into electrical connection as the rod is inserted into the tube.

31. In combination with the connecting-tube and its test-posts, a connecting-rod bearing an elastically-seated insulated conducting-disk, which forms the contact between the test-posts, and means whereby the length of said rod may be adjusted to compensate for different lengths of tube.

32. In combination with the conducting-tube and its test-posts, a connecting-rod bearing an elastically-seated insulated conducting-disk, which forms the contact between the test-posts, and means whereby the force of said spring may be adjusted to increase the effectiveness of the contact between the disk and posts.

33. The socket-plug constructed, as described, with a body of insulating material, two conducting-surfaces, $o'$ $o^2$, having binding-posts for the connecting-cords, and a central plunger in electrical contact with one of said binding-posts.

34. The connecting plug G, constructed, as described, with a plug-rod adjustable lengthwise therein to enable it to be properly fitted to the connecting-tube.

35. The combination, with the connecting plug-rod $f$, of the disk $g$, having a metallic annular or conducting surface on its face.

36. The connecting-plug handle composed of the socket part $h$, double nut $h'$, insulating-surface $h^2$, and cap-piece $i$, the latter binding the connecting-cord into electrical contact with the terminal of the plug-rod, as set forth.

JAMES O. SHIRAS.
EDWARD A. ECKERT.

Witnesses:
JOHN OELERING,
DANL. KELLY.